Nov. 10, 1959     W. H. PECK     2,912,264
JOURNAL BEARINGS
Filed Dec. 13, 1954
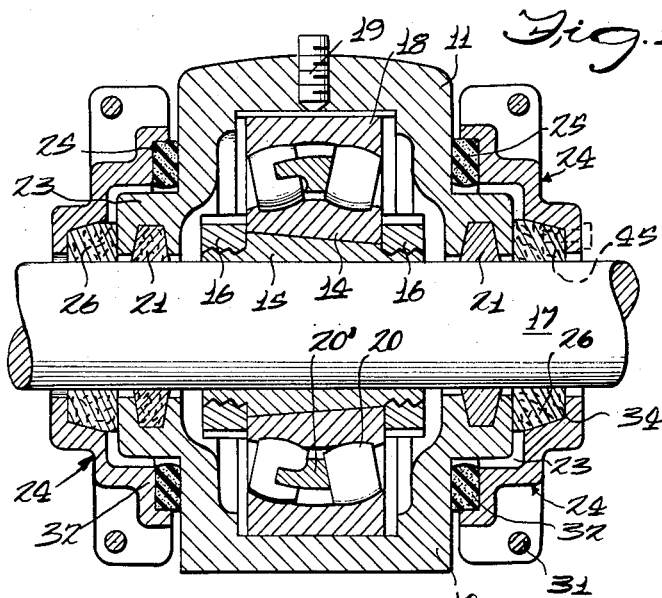
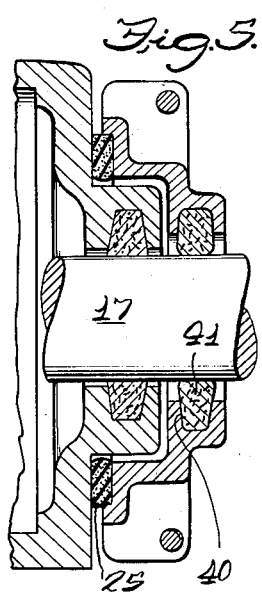
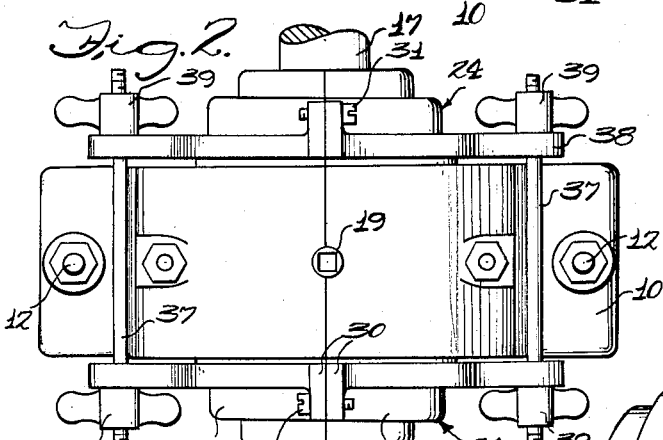
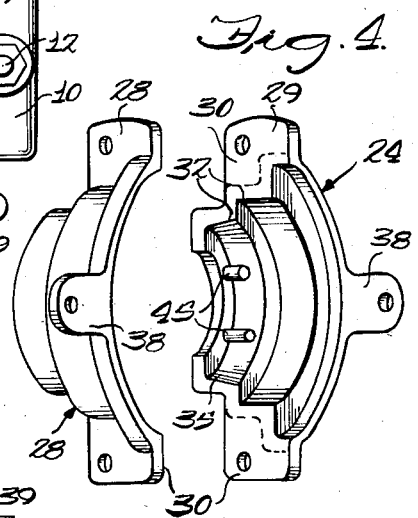
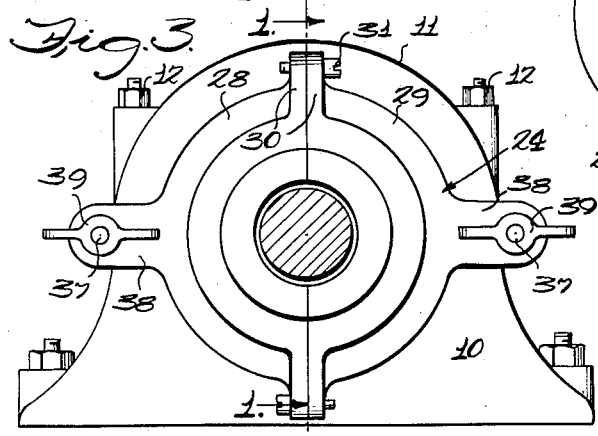
Inventor
William H. Peck
By Fred [illegible]
his Attorney

2,912,264
JOURNAL BEARINGS

William H. Peck, Tulsa, Okla., assignor of forty-five one-hundredths to William H. Peck, Jr., Tulsa, Okla.

Application December 13, 1954, Serial No. 474,795

1 Claim. (Cl. 286—7)

The invention relates to roller-bearings, and more particularly to sealing means for such bearings.

The object of the invention is to provide supplemental sealing means for preventing abrasive materials from reaching and cutting away the usual sealing rings which are provided on the pillow block to retain lubricant in the chamber around the bearings.

Another object of the invention is to provide auxiliary sealing means of this character which can be readily replaced without disassembling the shaft and bearing.

Another object of the invention is to provide auxiliary sealing means of this type which leaves the shaft free for self alignment with the outer race of the bearings.

Other objects will appear from the detail description.

The invention consists in the several novel features hereinafter set forth and more particularly defined by claim at the conclusion hereof.

In the drawings:

Fig. 1 is a longitudinal section taken on line 1—1 of Fig. 3 of a bearing embodying the invention;

Fig. 2 is a plan view;

Fig. 3 is a side elevation, the shaft being shown in section;

Fig. 4 is a perspective view of one of the housings for the auxiliary seals, the sections being separated for illustrative purposes; and Fig. 5 is a longitudinal section of a modified form of the invention.

The invention is exemplified with a roller-bearing pillow-block which may be of standard construction and comprises; a split pillow-block with a base-section 10 and a cap-section 11 which are secured together in mating relation by screws 12; a double tapered inner bearing race 14 fixedly secured by a conical member 15 and clamping rings 16 to the shaft 17; an outer race 18 fixedly secured in the pillow-block and rollers 20 guided by a retainer 20' adapted to run between the inner and outer races. Sealing rings 21 usually of felt are confined in annular grooves in hub-portions 23 which project outwardly from the sides of the pillow-block, for retaining the lubricant in the bearing-chamber in the pillow-block.

In practice, it has been found that sealing rings 21 in the pillow-block for oil-retaining effect are usually formed of delicate felt which is easily destructible or becomes impaired by sand or other abrasive substance or acid in the ambient atmosphere. This occurs more particularly in places like foundries in which the surrounding air is heavily laden with dust. When the sealing rings become impaired, oil leaks from the bearings and frequent replacement of oil becomes necessary or the bearings become worn. It is also desirable in these bearings to support the shaft for self alignment for which clearance is necessary between the shaft and the block, and this clearance must be sealed by the sealing ring in the block.

The invention provides devices which are demountably applied outside of and contiguously to the ends of the pillow-block around the shaft for excluding abrasive material in the ambient air from reaching the oil-seal in the pillow-block. These devices are auxiliary to the pillow-block and the seal therein and are applicable to and removable from the block and the shaft without disassembling the block or the shaft from the block.

Auxiliary devices are provided for the ends of the pillow-block when the shaft extends therethrough as in the exemplification shown in the drawings. Each auxiliary device comprises a split or sectional annular housing, generally designated 24, contiguous to a projecting hub-portion 23 of the block. Each housing 24 is formed of semi-circular sections 28 and 29 which terminate in lugs 30 which, when secured together in abutting relation by screws 31, form the annular housing. This sectional formation of the housing makes it possible to apply the housing to the assembled block and shaft. Each housing 24 is provided with an outer annular seat 32, angular in cross-section, for retaining and engaging a sealing ring 25 of sponge rubber or sponge plastic, or sponge neoprene treated with an oil-resistant solution. The inner face of ring 25 engages the contiguous end-face of block 11 outwardly of the hub 23 and is adapted to be compressed against said face of the housing. Each housing 24 is also provided with an inner annular seat 35 which is angular in cross-section. A ring 26 of flax-fiber or graphite rope, rectangular in cross-section, fits in the seat 35 against the outer end of contiguous hub-portion 23 and the outer periphery of shaft 17. Pressure of each housing toward the pillow-block will compress a ring 26 against the end of a hub-portion 23 and will also compress the inner periphery of said ring against the shaft 17.

The housings 24 are retained in operative relation to the block and are adjustable for that purpose by a pair of rods 37 which extend through perforated lugs 38 on the housing and across the front and rear of the pillow-block, respectively, and wing-nuts 39 threaded to the ends of said rods. When the nuts are turned to move one or both of the housings toward the pillow-block, the rings 25 are compressed between seats 32 and the sides of the pillow-block, and rings 26 are compressed against the ends of hub-portions 23, against the shaft 17, and against seat 34. This adjustment is also utilized to compensate for any wear on the rings 26 and can be readily effected while the shaft 17 and block 11 remain in operative relation. For this purpose, the seat 35 in housing 24 is outwardly tapered. Pins 45 in the housings hold the rings 26 against rotation with shaft 17. There is clearance between shaft 17 and the walls between which the sealing rings 21 are confined and between the shaft 17 and the central portion of the end-wall of each housing 24 to permit self alignment of shaft 17 in the roller bearing. The auxiliary devices can be applied to and removed from the bearing while the shaft is assembled with the pillow-block. In assembling the auxiliary devices with the block, the separated sections of the housings are positioned adjacent the ends of the block and secured together by screws 31. The rods 37 are then assembled with the housing and nuts 39 are tightened to press the rings 25 and 26 between the housing and the pillow-block and to press the ring 26 between the housings and shafts 17. The housing may be removed from the pillow-block and shaft upon withdrawal of the rods 37 from the lugs 38 on the housings and separation of the sections of each housing for replacement of rings 25 and 26 if necessary. This may also be done while the shaft and block remain assembled.

Fig. 5 illustrates a modification in which the housing for the auxiliary seals is provided with an inwardly facing annular channel 40 and a sealing ring 41 fitting in said channel, in lieu of the angular grooves 35 and sealing rings 26 shown in Fig. 1. The housings are otherwise of the construction described.

In the use of the invention, the sealing rings 25 and 26 prevent abrasive material from passing to and cutting or wearing away the felt in the sealing rings 21 which are confined in the pillow-block. This causes the rings 31 to remain effective to retain lubricant in the bearing and avoids the necessity of frequently replacing the lubricant or the rings 21. If a ring 26 or 41 becomes worn, it can be compressed to take up the wear by tightening one or both of the nuts 39 without disturbing the bearing in the pillow-block. If ultimately a ring 26 or a ring 25 should become defective, it can be readily replaced upon removal and replacement of the housings 24 without disturbing the shaft 17 or the bearing. At all times, the supplemental seals and housings do not interfere with self alignment of the shaft in the bearing.

The invention is not to be understood as limited to the details described, since these may be modified within the scope of the appended claim without departing from the spirit and scope of the invention.

Having thus described the invention what I claim as new and desire to secure by Letters Patent is:

The combination with a pillow-block provided on the outside of its ends with annular faces, said pillow-block providing a shaft-bearing, a shaft journalled in said bearing with extensions outside of the block, and oil-seals in the ends of the block and around the shaft, of supplemental sealing devices entirely outside of the block for excluding dust from the oil-seals, comprising annular housings including arcuate mating sections detachably secured together, extending around said shaft-extensions, having annular faces on their inner sides confronting and separable from the faces on the outside of the ends of the block, sealing-rings in the housings fitting around the shaft-extensions and between one pair of the confronting faces on the outside of the ends of the block and the inner faces on the housings, sealing-rings between the other pairs of said confronting faces, and means extending between the housings for demountably retaining the sealing-rings between said confronting faces and around the shaft-extension.

References Cited in the file of this patent

UNITED STATES PATENTS

| | | |
|---|---|---|
| 538,011 | Crawford | Apr. 23, 1895 |
| 637,327 | Edison | Nov. 21, 1899 |
| 1,288,277 | Symanzik | Dec. 17, 1918 |
| 1,543,147 | Zimmerman | June 23, 1925 |
| 1,766,706 | Dorer | June 24, 1930 |
| 2,510,659 | Riston | June 6, 1950 |
| 2,630,356 | Johnson | Mar. 3, 1953 |
| 2,641,518 | Trammell | June 9, 1953 |

FOREIGN PATENTS

| | | |
|---|---|---|
| 440,974 | France | May 17, 1912 |
| 482,873 | Great Britain | Apr. 6, 1938 |